United States Patent [19]

Arslanouk

[11] Patent Number: 5,718,945
[45] Date of Patent: Feb. 17, 1998

[54] SELF-LOCKING FASTENER, APPARATUS AND METHOD

[75] Inventor: Mahmoud Arslanouk, Haledon, N.J.

[73] Assignee: Nylok Fastener Corporation, MaComb, Mich.

[21] Appl. No.: 498,517

[22] Filed: Jul. 5, 1995

[51] Int. Cl.⁶ .............................. B05D 1/30; B05D 1/38; B05D 3/02
[52] U.S. Cl. .................. 427/181; 427/195; 427/202; 427/230
[58] Field of Search .................. 427/181, 195, 427/202, 235, 350, 230, 374.4

[56] References Cited

U.S. PATENT DOCUMENTS

| | | |
|---|---|---|
| 3,294,139 | 12/1966 | Preziosi .................. 411/303 |
| 3,416,492 | 12/1968 | Greenleaf .................. 118/620 |
| 3,552,467 | 1/1971 | Bergere . |
| 3,634,577 | 1/1972 | Kull . |
| 3,830,902 | 8/1974 | Barnes .................. 264/267 |
| 3,858,262 | 1/1975 | Duffy . |
| 4,775,555 | 10/1988 | Duffy .................. 427/183 |
| 5,607,720 | 3/1997 | Wallace et al. .................. 427/181 |

FOREIGN PATENT DOCUMENTS

| | | |
|---|---|---|
| 580546 | 1/1994 | European Pat. Off. . |
| 1553575 | 10/1969 | France . |
| 8906757 | 7/1989 | WIPO . |

*Primary Examiner*—Shrive Beck
*Assistant Examiner*—Fred J. Parker
*Attorney, Agent, or Firm*—Niro, Scavone, Haller & Niro

[57] ABSTRACT

A self-locking fastener having a highly localized, substantially splatter-free patch, and an apparatus and method for making such a fastener. The invention finds particular application with very small, internally threaded fasteners, but can be used with a wide variety of other fasteners, as well.

19 Claims, 3 Drawing Sheets

5,718,945

SELF-LOCKING FASTENER, APPARATUS AND METHOD

BACKGROUND OF THE INVENTION

This invention relates to an improvement in the manufacture of threaded fasteners that use thermoplastic patches to produce a self-locking effect. More particularly, the invention relates to the provision of a fastener having an improved, highly localized, substantially splatter-free patch, and an improved apparatus and process for making this fastener.

The manufacture of self-locking threaded fasteners that use a patch of thermoplastic resin on one side of the threaded fastener, applied by heating the threaded fastener and then spraying powdered resin onto the threads of the fastener, is known in the art and has enjoyed commercial success. U.S. Pat. No. Re. 28,812 (Duffy, formerly U.S. Pat. No. 3,579,684), for example, describes such a method of manufacturing self-locking threaded fasteners. When a bolt prepared in this manner is threadably engaged with a nut, the thermoplastic material adhering to the sides of the threaded flanks (the bearing surfaces) provides locking pressure which dramatically increases the torque required for disassembly, thus rendering the bolt self-locking. Patches of this sort can be formed on the internal threads of female fasteners, as taught in U.S. Pat. No. 3,894,509 (Duffy), as well as on the exterior threads of male fasteners.

The prior art describes various methods for enhancing the ease of assembly of such fasteners, such as by applying the resin powder so as to provide a thicker layer of thermoplastic on the flanks of the threads than on their crests, as in U.S. Pat. No. Re. 28,812.

The prior art also discloses methods for increasing the retaining power of such fasteners when the male and female members are at the outside limits of dimensional tolerances by applying the resin so as to form a continuous ridge or bar of plastic above the thread crests, a result accomplished by reducing the application temperature slightly below that required to form a smooth, continuous coating of plastic, as in U.S. Pat. No. 3,787,222 (Duffy). And several different types of heating and spraying machines for applying the thermoplastic resin coatings to the exterior threads of male threaded fasteners have been patented, as in U.S. Pat. No. 3,452,714 (Burke et. al.) and 3,530,827 (Burke). Methods of applying such patches to the internal threads of female threaded fasteners also are known, as illustrated by U.S. Pat. No. 3,894,509 (Duffy).

As can be seen, prior art methods of applying powder patch to fasteners have traditionally sprayed the powder onto a fastener mounted on a movable apparatus, such as a carriage. While spray applicators have proven adaptable to high-speed, automatic processes for producing large quantities of self-locking fasteners, there are disadvantages to the use of spray applicators. The application surface of a sprayed patch will have varying degrees of splatter (i.e., random patch particles located outside of the intended patch area), depending upon the particular application, the fastener and patch size, and the speed of the application.

Also, traditional spray applications using a spray applicator require that the end of the nozzle of the spray tube protrude into an internally threaded fastener in order to provide a commercially acceptable patch that is substantially splatter-free, or that does not have powder on the exterior surfaces of such a fastener. For this reason, prior art "externally-applied" powder spray applicators have found it difficult, if not impossible, to apply a highly localized patch to small, internally threaded fasteners, such as "No. 2" fasteners having an internal diameter of 0.080 inches, or even smaller internally threaded fasteners.

It has also proven difficult for externally-applied powder spray applicators to be used with a wide variety of fasteners, such as very small, internally threaded fasteners, as well as closed "acorn" nut fasteners.

Other examples of externally-fed powder applicators are described in U.S. Pat. No. 3,830,902 to Barnes and U.S. Pat. No. 3,294,139 to Preziosi. Neither discloses the ability to deposit a highly localized patch of powder onto the internal threads of very small fasteners, or in a substantially splatter-free manner.

As used here, a "substantially splatter-free" patch shall mean a patch in which less than 10% of the intended threaded surface area to be covered with patch lies outside of the intended patch. In other words, referring to FIG. 15, if "X" is the intended threaded surface area to be covered with patch, and "Y" is the "splatter" area, Y is less than (10%)(X).

SUMMARY OF THE INVENTION

Accordingly, the object of this invention is to provide small, internally threaded fasteners with a self-locking, highly localized patch that is substantially splatter-free, and to also provide an apparatus and method for producing such a fastener.

An additional object of the present invention is the provision of a patch for internally threaded fasteners that is similar in appearance and consistency to "strip" or "pellet" patches, without the necessity for using the time-consuming and expensive methods traditionally required for producing such patches. Thus, the formation of "strip" or "pellet" patches requires the milling out of a portion of the fastener, and replacement of the milled-out portion with a correspondingly-sized piece of resin powder attached by heat fusing or adhesives. As those of ordinary skill in the art will recognize, pellet patches are typically formed by press-fitting the pellet into a hole in the side of the fastener. It would be highly desirable to provide a patch visually similar to a "strip" or "pellet" patches without having to mill the fastener.

Another object of the present invention is to provide a substantially splatter-free self-locking patch that deforms upon installation, producing frictional resistance and locking force retention that meets the torque and vibration requirements of applicable test procedures required under qualifying specifications, and after exposure to elevated temperatures, including Military Specification Mil-F-18240E, and IFI-124 of the Industrial Fastener Institute.

Still another object of the present invention is to provide a self-locking patch that can be selectively provided in various geometrical configurations, and that can be deposited so as to selectively cover, or leave uncovered, a predetermined number of lead threads for a given fastener.

Yet another object of the present invention is to provide a self-locking patch that can be used with a wide variety of fasteners, including small, internally threaded fasteners, closed "acorn" nuts, and specialty fasteners of varying sizes, shapes and configurations.

To achieve these objects, a threaded fastener is provided having an internally threaded portion adapted for uniform engagement with a mating fastener, and a self-locking patch is provided that aheres to at least a portion of the internally threaded portion of the threaded fastener. The patch is a localized, substantially splatter-free patch that provides a jamming action to retard the disengagement of the threaded fastener from the mating fastener. Preferably, if a polyphthalamide resin is used the fastener of the present invention meets or exceeds the minimum torque and vibration requirements set forth in MIL-F-18240E. In one embodiment of the present invention, threaded fasteners having an internal diameter as small as or less than 0.080 inches can be provided with this substantially splatter-free self-locking patch.

An apparatus for providing at least a preselected surface of an internally threaded portion of an internally threaded fastener with a substantially splatter-free, self-locking patch also forms part of the present invention. The apparatus includes a powder applicator in engageable contact with the threaded fastener, and means for transferring powder to the powder applicator. Also provided is means for conveying a predetermined amount of powder from the powder applicator to a position immediately adjacent the preselected surface of the internally threaded portion of the threaded fastener, and for depositing the predetermined amount of powder directly onto the preselected surface.

A process for providing a preselected portion of a threaded fastener with a substantially splatter-free, self-locking patch also forms part of the present invention. The process includes the steps of first preparing a resin powder, and then providing a predetermined amount of the powder to a powder applicator in communication with the preselected portion of the threaded fastener. The predetermined amount of powder from the powder applicator is then conveyed by the powder applicator to a position immediately adjacent the preselected portion of the threaded fastener. Next, substantially all of the predetermined amount of powder is deposited directly onto the preselected surface. The threaded fastener is then heated to a temperature sufficient to cause adhesion and fusion of the resin powder onto the preselected portion of the threaded fastener, as a result of transfer by conduction of sensible heat from the threaded fastener to the resin powder. Alternatively, further powder applications and reheating can follow this heating step. The result is an internally-fed powder application system in which a controlled, metered quantity of powder can be deposited, in a highly localized, substantially splatter-free fashion, onto the threads of fasteners, including very small, internally threaded fasteners.

DETAILED DESCRIPTION OF THE INVENTION

Figure 1:
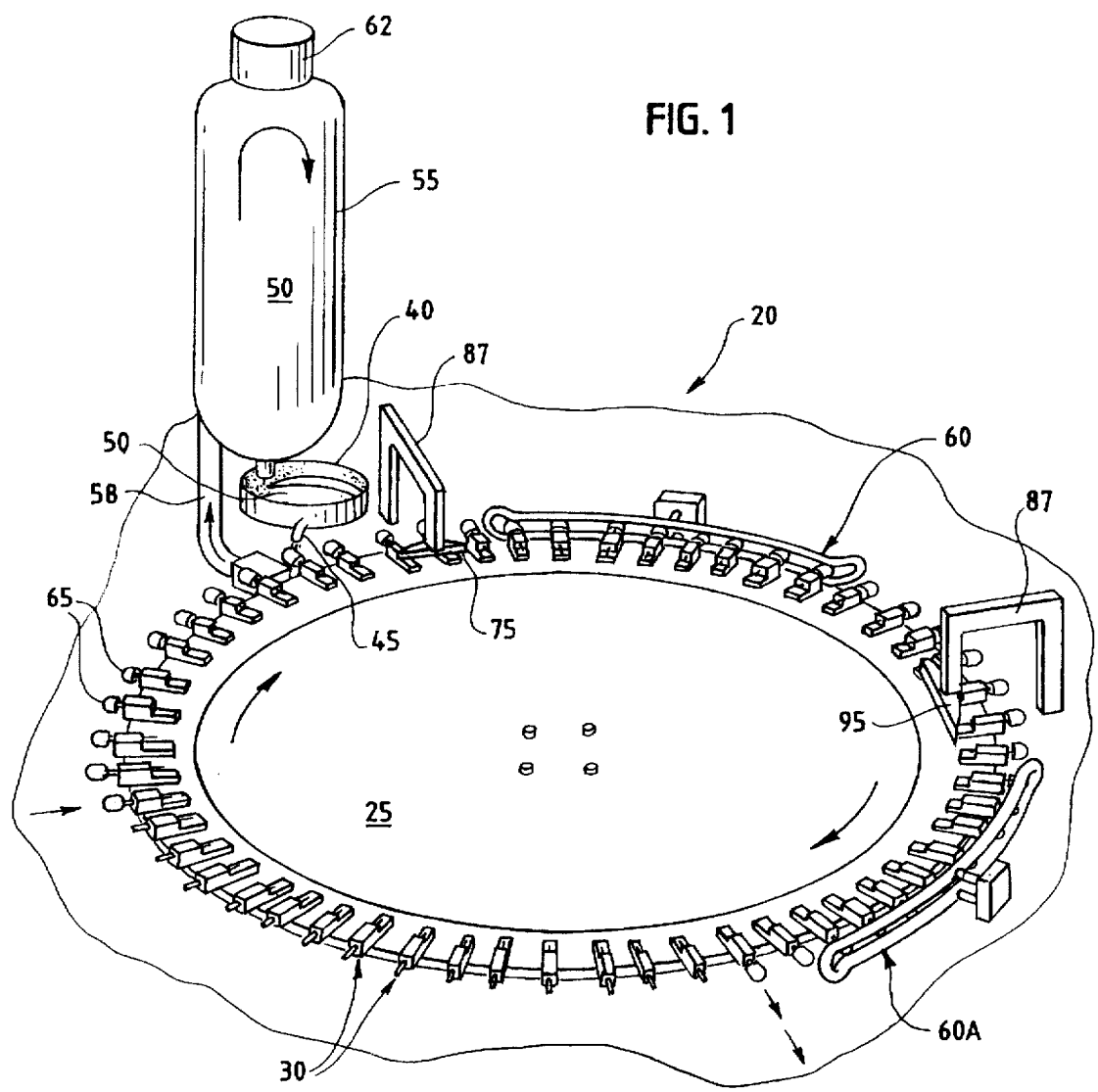
FIG. 1 is a perspective view of a preferred embodiment of the apparatus of the present invention, employing a rotating carriage.
Figure 2:
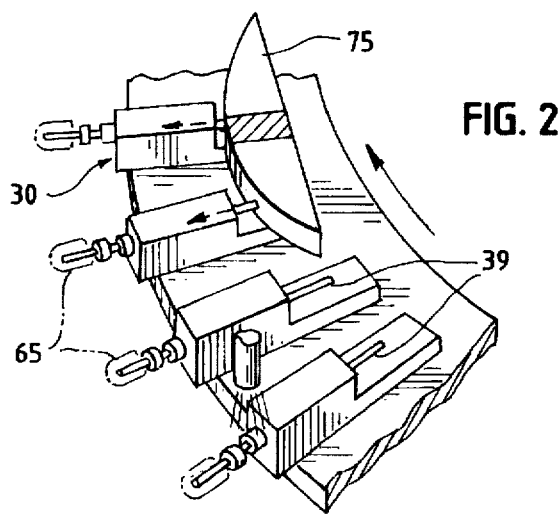
FIG. 2 is an enlarged view similar to FIG. 1 of a selected portion of the carriage.
Figure 3:
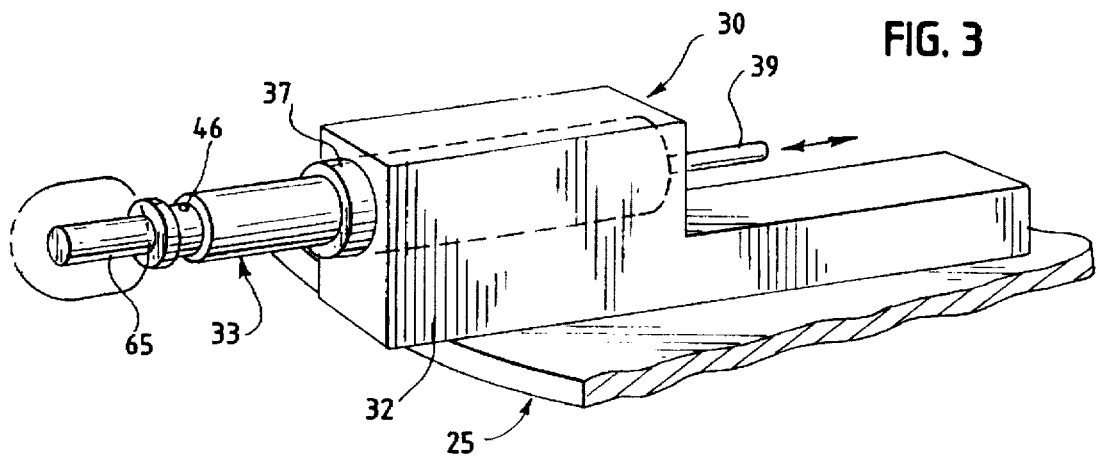
FIG. 3 is an enlarged side and planar view, partially in cross-section, of one embodiment of the powder applicator of the present invention.
Figure 4:
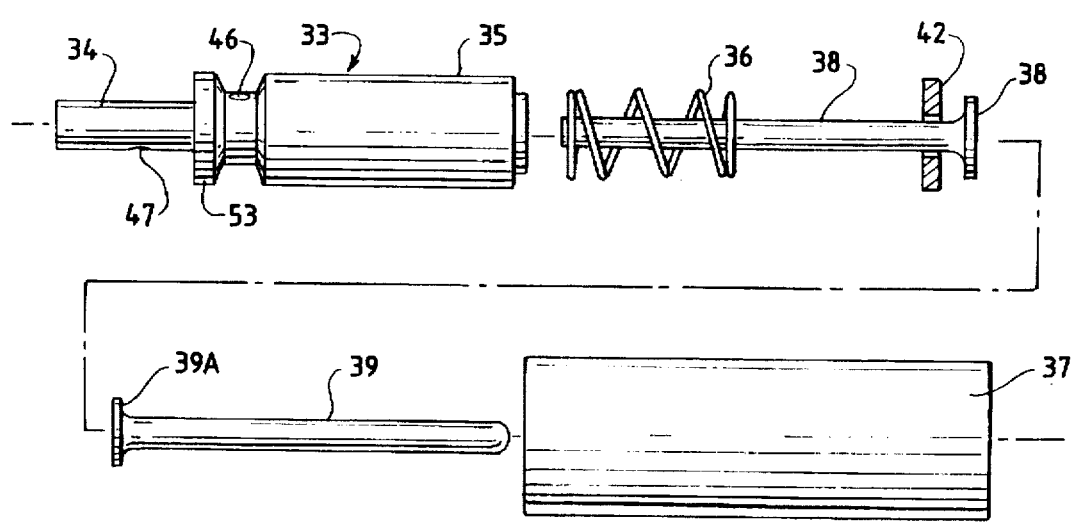
FIG. 4 is an enlarged side view illustrating the interconnection of the components of the powder applicator shown in FIG. 3.
Figure 5:
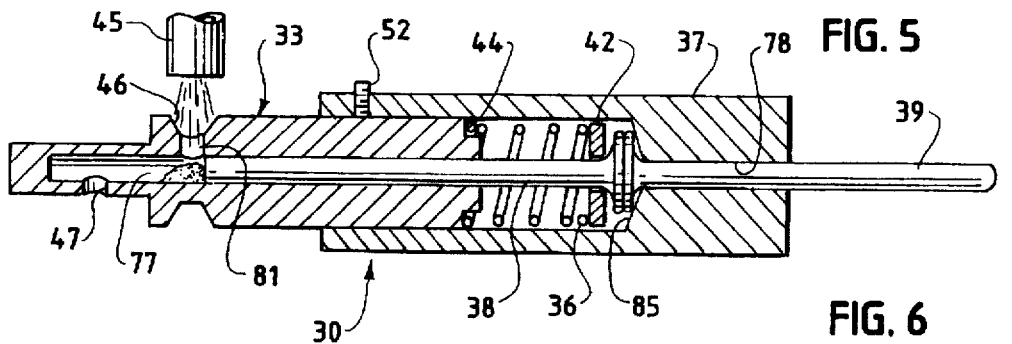
FIG. 5 is an enlarged side, cross-sectional view of the powder applicator, taken along section line 5—5 of FIG. 3.

The apparatus of the present invention, designated generally as 20, is shown in FIG. 1. Apparatus 20 employs a rotating turntable or carriage 25 carrying a number of novel powder applicators, designated generally as 30, about the outer periphery of the carriage. A powder tray 40 houses the powder resin 50, and is equipped with a discharge tube 45 for depositing the resin at a predetermined location on powder applicator 30, as will be described below. A vacuum 62 positioned above container 55 causes air to flow in through intake tube 58; the flowing air carries excess powder from the powder applicators 30 through tube 58 and into container 55, where the powder is then recycled back to powder tray 40.

Referring to FIGS. 2–6, the novel structure of powder applicator 30 of the present invention will now be described. Powder applicator 30 includes housing 32, which serves to rigidly attach powder applicator 30 to the upper surface of carriage 30. Secured to housing 32 are two basic mating components, cylindrical powder enclosure 33 and rod or plunger enclosure 37. Opposing rods or plungers 38 (having plunger head 38A) and 39 (having plunger head 39A) are adapted to move axially within bore 77 of powder enclosure 33 and bore 78 of plunger enclosure 37, respectively. Powder enclosure 33 includes metering or feed tube 34, having a downwardly facing discharge aperture 47, and an intermediate portion 35, with a vertical bore 81 terminating in upwardly facing aperture 46. Shoulder 53 separates intermediate portion 35 from feed tube 34.

Figure 6:
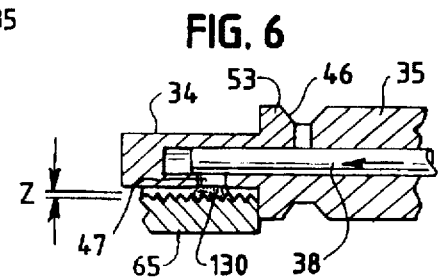
FIG. 6 is a view similar to FIG. 5 of a selected portion of the powder applicator shown in FIG. 5, illustrating the operation of the powder applicator.
Figure 7:
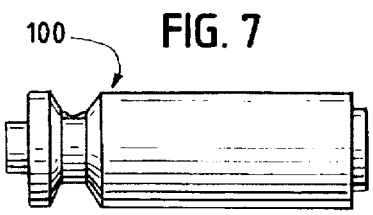
FIG. 7 is an enlarged side view of a portion of an alternative embodiment of a powder applicator according to the present invention.
Figure 8:
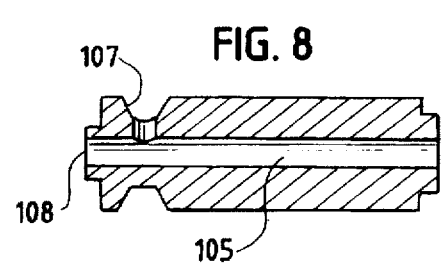
FIG. 8 is a cross-sectional view of the powder applicator embodiment shown in FIG. 7, taken along section line 8—8 of FIG. 7.
Figure 9:
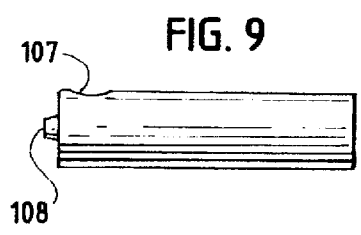
FIG. 9 is an enlarged side view of a portion of yet another alternative embodiment of a powder applicator according to the present invention.
Figure 10:
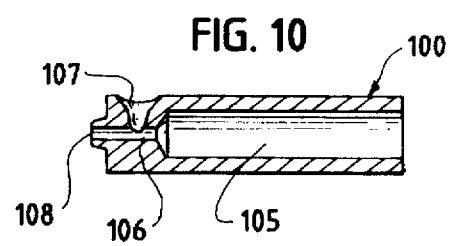
FIG. 10 is a cross-sectional view of the powder applicator embodiment shown in FIG. 9, taken along section line 10—10 of FIG. 9.

The operation of powder applicator 30 will now be described. An internally threaded fastener 65 is initially placed over the outer periphery of feed tube 34, and moved axially until the outer edges of the fastener contact shoulder 53, as shown in FIG. 6. Referring also to FIG. 1, as carriage 30 rotates clockwise, powder from discharge tube 45 drops, by gravity, into aperture 46 of powder enclosure 33. (A funnel or other tube, not shown, can be used to minimize excess powder during this process.) Powder enclosure 33 and plunger enclosure 37 are interconnected by set screw 52 into position so that, initially (i.e., when rod 39 is not depressed in a radially outward direction), spring 36 is uncompressed, and the plunger head 39A contacts shoulder 85 of bore 78 within plunger enclosure 37, so that the end of rod 39 does not block vertical bore or passage 81. ("Outer" and "inner" as used herein mean in a direction radially outward or radially inward, respectively, about the upper surface of cylindrical carriage 30.) Next, the innermost portion of rod 39 contacts triangular-shaped stop 75, rigidly positioned by stop holder 87 on the inner side of powder enclosures 30. Stop 75 is preferably shaped and positioned so as to permit rod 39 to be moved in a controlled fashion during rotation of carriage 30, as follows: first, in a radially outward direction (compressing washer 42 and spring 36 against inner shoulder 44 of powder enclosure 33), and then in a radially inward direction back to the initial position of rod 39.

As rod 38 is depressed and moves axially outward (due to the corresponding movement of rod 39 as it contacts stop 75), the resin powder which was initially dropped through aperture 46 and deposited at the bottom portion of vertical bore 81 is moved axially in a radially outward direction until it meets aperture 47; then, the powder again drops, by gravity, onto the internal surface of fastener 65 positioned about feed tube 34, as shown in FIG. 6. In this manner, and as shown in FIG. 6, powder is applied to a preselected location within the internal periphery of the internally threaded fastener without the need for mechanical intrusion of a nozzle device that has substantially the same outer diameter as the inner diameter of the fastener. An aperture (not shown), communicating between bore 78 of plunger enclosure 37 and the atmosphere, can be used to remove the possibility that air pressure can build up within bore 78 to sufficient levels to interfere with the powder application.

Next, fasteners 65 are heated to an appropriate temperature by any means well known in the art, such as by positioning the fastener in the magnetic field of high frequency induction heating coil 60 (FIG. 1), which will bring the fastener, in a predetermined short period of time, to a temperature sufficient to melt the plastic powder. Preferred temperature ranges for the nylon resins used with the present invention are typically between 550° F. and 600° F. (Of course, this is a temperature range for the heated fastener; the resin itself may melt at a temperature far less than this, such as about 250° F. but, as those of ordinary skill in the art will appreciate, it is necessary to heat the fastener to significantly higher temperatures to ensure that the melted resin will adhere to the heated fastener. However, higher or lower temperatures can be used, depending upon the resin powder and the application, as will be apparent to those skilled in the art. The present invention can be used with conventional powdered thermoplastic resins, such as nylon powders. For certain high-temperature applications, it may be desirable to use polyphthalamide resins having discrete particle sizes and sold as "NYTEMP"™ by Nylok Fastener Corporation, as disclosed in U.S. Pat. No. 5,356,254, whose disclosure is incorporated herein by reference. An epoxy or pre-coat in liquid form can also be applied to predetermined locations on a fastener using the apparatus and process of the present invention.

In any event, depending upon the resin material and the particular application, an appropriate temperature should be selected so that the resulting self-locking fasteners meets or exceeds the torque and vibration requirements set forth in Mil-F-18240E and/or IFI-124.

In the preferred embodiment, a second stop 95 is positioned "downstream" (i.e., clockwise about carriage 30) from stop 75 and heating coil 60. In a similar manner as has been described with reference to stop 75, powder 50 again drops (powder discharge apparatus is not shown here), by gravity, onto the internal threads of fasteners 65, in a predetermined, localized location. Stop 95 is preferably located downstream of heating coils 60 a sufficient distance to permit a slight cooling of powder 50 prior to a further powder application. Following this second powder application, heating coil 60A located downstream of stop 95 can be used to reheat the fastener, ensuring that the powder deposited from the second powder application will fuse with and properly adhere to the powder deposited from the first powder application. Preferably, however, this reheating station 60A need not be used, since it has been found that if the second powder application is positioned sufficiently close to heating coil 60, the powder applied during the second powder application will fuse to the heated powder applied to the first powder application, without the need for any reheating.

Alternatively, though not in a preferred embodiment, stop 95 can be positioned adjacent stop 75 and upstream of heating coil 60. In another alternative, though not preferred, embodiment, heating coil 60 can be placed upstream of stops 75 and 95. This embodiment has not been tested, but it is not preferred because it is believed that heating the fastener prior to powder application onto the fastener threads may cause the powder to fuse onto the internal surfaces of powder applicator 30, potentially clogging apertures 46 or 47, or bore 77.

The purpose of two separate powder applications is two-fold. First, more powder can be applied without causing the height "Z" (shown in FIG. 6) of the deposited powder to reach a level within fastener 65 which will cause obstruction of aperture 47, or which will cause fastener 65 to become fused to feed tube 34. Thus, after the first powder application, and following heating, the resin powder liquifies and flows into a more even deposition having a lesser height X; this permits a further powder application while still maintaining the height X of the deposited powder within acceptable limits. Second, it has been found that substantially all of the powder initially metered from discharge tube 45 into aperture 46 of powder enclosure 33 can be deposited onto the threads of fastener 65 using two powder applications.

It should now be apparent that different lengths of rods, springs and other components can be used to accomodate different fasteners or different applications. For example, the use of a longer rod or, conversely, the adjustment of the amount of depression on rod 39 caused by stop 75, will provide a patch 130 with a different axial length.

It will also be apparent that the location of shoulder 53 with respect to the outer end of feed tube 34 can also be changed to accomodate fasteners of different axial lengths. (For this reason, shoulder 53 can be constructed so as to be slidable along the outer perphery of feed tube 34, though also be capable of being fixed in position.) Also, it is envisioned that sleeves can be placed over the periphery of feed tube 34 to accomodate fasteners of substantially larger diameters than the diameter of feed tube 34.

The outer diameter of feed tube 34 should be sized so that, after powder has been applied to the internal threads, fastener 65 can still be easily disengaged (either manually, or by compressed air, for example) from feed tube 34, without blockage of aperture 47 due to patch build-up within the fastener. Powder applicator 30 is preferably constructed of a rigid material that can be heated without deforming or changing shape, such as brass. Preferably, the material chosen will expand proportionately less than the threaded fastener, ensuring that binding of the threaded fastener onto feed tube 34 of powder applicator 30 will not occur during heating of the fastener.

During deposition of the powder from discharge tube 45 into aperture 46, blowers, jets or vacuum tubes can be used to direct excess powder not falling into aperture 46 back into the system for reuse, as shown in FIG. 1. As will be appreciated by those of ordinary skill in the art, while only discharge tube 45 has been disclosed, various means are available for dispensing resin powder into feed tube 34. Preferably, however, the constant rotation of carriage 30 is not interrupted, so that a consistent, metered deposition of powder being supplied to feed tube 34 through aperture 46 can be maintained.

While the present invention is believed to have particular significance for providing small, internally threaded fasteners with a self-locking patch, larger or non-internally threaded fasteners can also be used with the present invention.

Alternative embodiments of the powder applicator of the present invention, shown in FIGS. 7–10, can be used. The embodiments shown in FIGS. 7–10 function in a manner similar to the embodiment already described, except that feed tube 100 of this embodiment is different. Referring first to the embodiment shown in FIGS. 7 and 8, feed tube 100 includes central bore 105 and upwardly-facing aperture 107, and terminates at its outer end in an aperture 108 axially aligned with bore 105 and magnetically connected to an annular magnetized piece (not shown); the threaded fastener, in turn, is connected to the magnetized piece. This permits powder to be dropped into aperture 107, where it can then be transferred to the outer end of feed tube 100 (using the means described above, for example) through (e.g.) a centrally located bore in the magnetized piece, and onto a threaded fastener. The feed tube embodiment 100 shown in FIGS. 9 and 10 functions in a manner similar to that shown in FIGS. 7 and 8, and includes bores of different diameters, including central bore 105A and outer bore 106A, which can be used with even smaller fasteners.

Referring now to FIGS. 11–14, self-locking fasteners made according to the present invention are shown. The highly localized, substantially splatter-free patch achieved using the apparatus and process of the present invention visually appears to be a "strip" or "pellet" patch though, of course, the fastener need not be milled.

Figure 13:
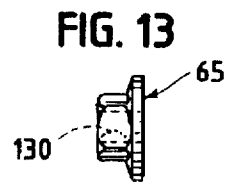
FIG. 13 is a view similar to FIG. 11 of a different fastener with a self-locking patch according to the present invention.
Figure 14:
FIG. 14 is a view similar to FIG. 11 of a different fastener with a self-locking patch according to the present invention.
Figure 15:
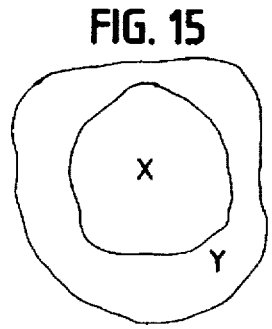
FIG. 15 is a view, illustrating in schematic form, the relative surface areas of an intended patch area ("X") and patch outside the intended patch area ("Y").

Referring to FIGS. 13 and 14, patches using the apparatus and process of the present invention can be achieved with internally threaded fasteners as small as "No. 2" fasteners, or even smaller fasteners. Of course, much larger patches using variations of the disclosed embodiments can be formed with much larger fasteners, as well.

Figure 11:
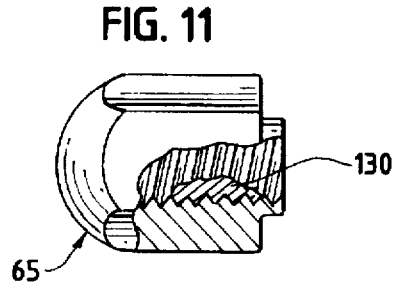
FIG. 11 is a side view, with a removed portion partially in cross-section, of an internally threaded fastener with a self-locking patch according to the present invention.
Figure 12:
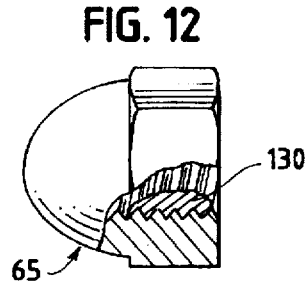
FIG. 12 is a view similar to FIG. 11 of a different fastener with a self-locking patch according to the present invention.

In cross-section, and referring now to FIGS. 6, 11 and 12, the patch 130 formed by the present invention tends to be generally thicker in its center and thin progressively toward both edges. The patch according to the present invention can be made into various geometrical shapes; for example, if a circular aperture 47 is used, the resulting patch will be generally circular. Conversely, patches with other geometrical patterns can be obtained, given the geometrical configuration of the discharge aperture.

Also, for a particular application, it is often required that the lead threads on either side of the fastener remain uncovered by powder. The present invention permits the selective application of powder to a threaded fastener, leaving a predetermined number of lead lines of the fastener uncovered by powder. This is easily accomplished simply, for example, by varying the location of shoulder 53, and thus varying the length of feed tube 34; this, in turn, will change the location of discharge aperture 47 relative to the fastener threads. This can also be accomplished by varying the shape or size of discharge aperture 47.

It will also be understood that methods known to those skilled in the art can be used to produce variations in the thickness of the patch 130 in the valleys, on the crests and on the helical bearing surfaces of the threads so as to improve locking power when the male and female threaded fasteners are near the outer limits of dimensional tolerances, as in U.S. Pat. Nos. 3,787,222 and 3,554,258, and that fasteners with high temperature resin patches of such varying conformations also are within the scope of this invention.

It will be appreciated by those skilled in the art that there are other methods of practicing the invention. For example, conventional liquid primers can be pre-applied to the threaded fasteners before application of the self-locking patches. As another example, separate rods 38 and 39 can be replaced by a single, unitary rod having (for example) an intermediate portion with an enlarged diameter, which can function in a manner similar to rods 38 and 39. As a further, non-limiting example, powder applicator 30 can be constructed as a single, unitary structure rather than consisting of components 33 and 37. Other variations on the disclosed embodiments will be apparent to those disclosed in the art, and an exhaustive list of potential variations is not given here. The foregoing examples are illustrative only, and are not intended to limit the scope of the claims in any manner.

I claim:

1. An automated process for applying a patch of resin material to threads on a threaded bore of an internally threaded fastener having at least one open end, comprising the steps of:

positioning the fastener such that an open end is in a generally horizontal orientation;

providing a transfer conduit having a powder receiving port, a powder discharge port, and an axially extending passageway connecting the ports;

aligning the transfer conduit and the fastener so that the powder discharge port is positioned within the threaded bore of the fastener and juxtaposed adjacent a portion of the threads of the fastener;

delivering a quantity of resin powder to the transfer conduit via the powder receiving port, conveying the resin powder along the passageway, and discharging the resin powder from the transfer conduit through the powder discharge port by gravity onto the portion of the fastener;

and heating the threaded fastener having the resin powder thereon to a temperature sufficient to fuse the resin powder to the portion of the fastener, thereby forming the patch of resin material.

2. The automated process of claim 1, wherein the patch is a substantially splatter-free patch.

3. The automated process of claim 1, wherein the powder discharge port can be positioned at different axial distances along the length of the passageway.

4. The automated process of claim 1, wherein a predetermined amount of the resin powder is delivered to the powder receiving port, the predetermined amount being sufficient to provide a self-locking patch which provides a jamming action that will retard disengagement of the threaded fastener from a mating fastener to satisfy known minimum torque removal requirements.

5. The automated process of claim 4, wherein the predetermined amount of resin powder is sufficient to satisfy the minimum torque removal requirements set forth in MIL-F-18240E.

6. The automated process of claim 1, wherein the fastener has the threaded bore open at only one end.

7. The automated process of claim 1, wherein the fastener is heated following the powder discharge step.

8. The automated process of claim 1, wherein the fastener is heated prior to the powder discharge step.

9. The automated process of claim 1, further comprising one or more repetitions of the powder discharge and heating steps.

10. The automated process of claim 1, wherein the outer diameter of the portion of the transfer conduit associated with the powder discharge port is substantially less than the inner diameter of the threaded bore of the fastener.

11. The automated process of claim 4, wherein the quantity of resin powder delivered to the transfer conduit via the powder receiving port is a predetermined, substantially constant amount of resin powder.

12. The automated process of claim 1, wherein the powder delivery and powder discharge steps are periodically accomplished with a plurality of fasteners using a corresponding number of transfer conduits positioned along a rotating carriage.

13. The automated process of claim 12, wherein a corresponding number of radially movable plungers are positioned within the passageways of the transfer conduits for accomplishing the powder discharge step.

14. The automated process of claim 1, wherein the resin powder is a polyamide resin.

15. The automated process of claim 1, wherein the resin powder is a polyphthalamide resin.

16. The automated process of claim 1, wherein the threaded bore of the internally threaded fastener has a diameter of less than about 0.080 inches.

17. The automated process of claim 1, wherein the heating step is accomplished using one or more induction heating coils.

18. The automated process of claim 1, further comprising the step of removing excess resin powder from the transfer conduit using vacuum means.

19. The automated process of claim 1, wherein the transfer conduit is constructed of a material which will expand proportionally less than the material of the internally threaded fastener.

* * * * *